Jan. 8, 1935.  F. H. CORNELIUS  1,986,878
FURNACE
Filed March 7, 1931

WITNESS:
Wm. C. Groome

INVENTOR
Frank H. Cornelius.
BY
William R. Coley
ATTORNEY

Patented Jan. 8, 1935

UNITED STATES PATENT OFFICE 1,986,878

FURNACE

Frank H. Cornelius, Swissvale, Pa.

Application March 7, 1931, Serial No. 520,939

8 Claims. (Cl. 126—113)

My invention relates to furnaces and particularly to furnaces of the air circulating type.

One object of my invention is to provide a furnace of the above-mentioned type with a device that shall absorb the moisture deposited in the heat exchanger because of the cooling of the combustion gases therewithin.

Heretofore, it has been the practice to employ separate conduits connected to the exchanger to drain the water collecting therein away from the furnace and onto the basement floor, or into a drain.

In practicing my invention, I provide a device for absorbing the moisture which is evaporated by the circulated air as fast as it is absorbed, thus eliminating the draining system.

Another object of my invention is to position the absorptive material within the air passage of the system, ahead of the customary humidifying device, in order to effect a rapid rate of evaporation.

With these principles and objects in mind, my invention will best be understood by referring to the following specification taken in conjunction with the drawing, wherein.

Figure 1:
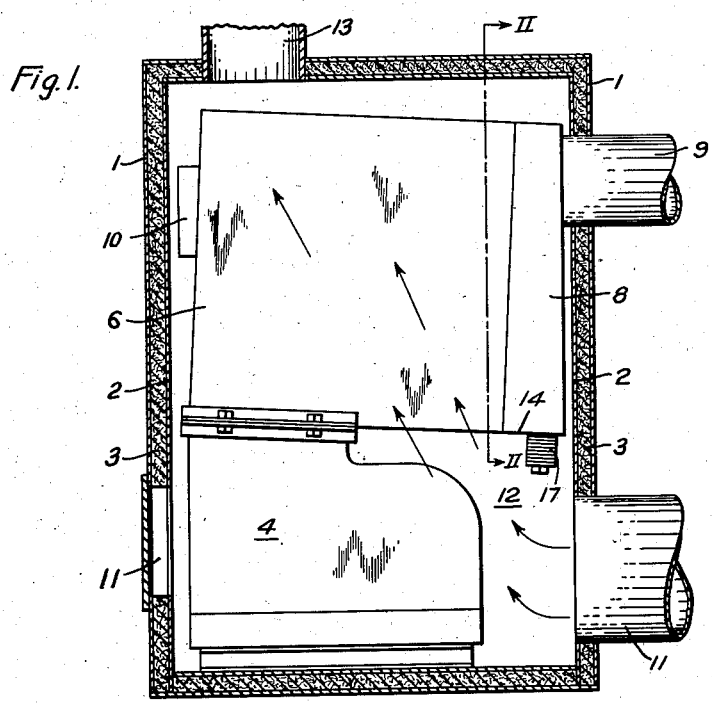
Figure 1 is a longitudinal sectional view of a furnace embodying my invention.
Figure 2:
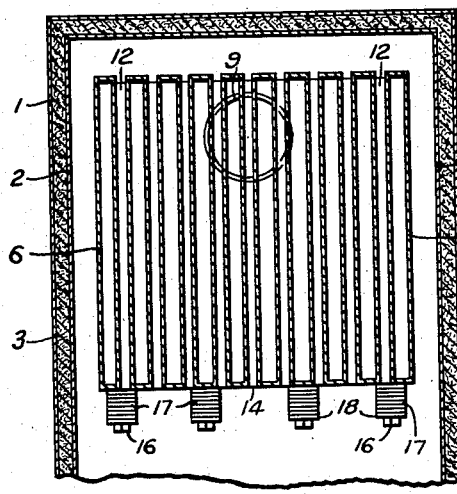
Fig. 2 is a transverse sectional view of a portion of the structure shown in Fig. 1 taken along the line II—II thereof.

My invention comprises, in general, an outer casing 1 and an inner casing 2 between which a heat insulating material 3 is packed and employed to prevent radiation in a manner well known in the art.

A combustion chamber 4 is provided in the lower portion of the casing 2 in which gas, oil, coal or other well known fuels may be consumed. The combustion gases thereof pass upwardly out of the combustion chamber 4 and through radiating tubes 6 that are provided with baffles which provide a tortuous path for the gases. The radiating tubes, through which the gases pass, are connected to a chamber 8 wherein the combustion gases, passing through the radiating tubes 6, co-mingle and pass therefrom out of a smoke breeching 9.

An air inlet 11 is associated with the lower portion of the casings 1 and 2 through which air passes either by convection, or preferably, by means of an agitator, such as a fan or blower (not shown). The air so passing into the casing 2 is sealed from the combustion gases by the combustion chamber 4 and passes out through the spaces 12 between the radiating tubes 6 which constitute a heat exchanger. The air, in this manner, becomes heated and, upon passing near the customary humidifying device 10, becomes humidified before passing into the air conveying duct 13.

The air, in passing through the heat interchanger, cools the gases of combustion that pass through the tubes 6, which thereby deposit moisture on the inner surface of the walls of the tubes 6 and the walls of the chamber 8. The tubes 6 slope toward the chamber 8 and the moisture, so deposited, collects at the bottom of the chamber from which it must be removed, in order to prevent the deterioration of the materials constituting the said walls.

Figure 3:
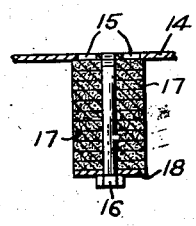
Fig. 3 is an enlarged view, in longitudinal section, of the moisture absorbing device shown in Figs. 1 and 2.

Referring to Fig. 3, the bottom 14 of the chamber 8 is provided with apertures 15. A bolt 16 is supported on the portion 14 and provided with moisture absorbing washers 17 that cover the aperture 15 and against which they are tightly held by means of a metal plate 18 and the bolt 16. The moisture absorbing washers 17 are made of filtering material having heat resisting materials, such as asbestos or the like, associated therewith, in order to prevent deterioration and the escape of the products of combustion into the air stream. The bolt 16 is threaded for an appreciable distance from its end, in order that it may be adjusted to compress the material 17 an amount sufficient to prevent the combustion gases from leakage into the air passage. Variations of pressure on said material also serve to regulate the rate of filtration thereof.

Figure 4:
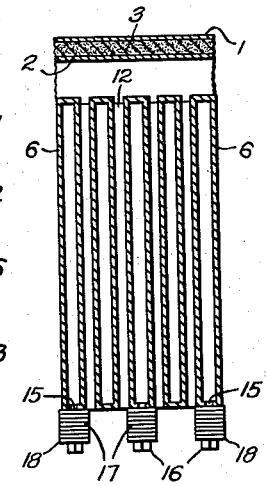
Fig. 4 is a fragmentary sectional view of a modification of the structure shown in Figs. 1 and 2.

From experiment, I have found that, in the majority of furnaces, a pair of such moisture absorbing members are adequate to absorb the waters collected in the chamber 8 and to have the moisture so collected absorbed by the circulated air. It is to be understood, however, that when large furnaces or fuels having considerable moisture are employed, any number of the absorbing devices may be provided on the chamber 8. It is also to be understood that the chamber 8 may be eliminated and one of the absorbing devices attached to each of the radiating tubes 6, as shown in Fig. 4.

It will thus be seen that I have provided a means for absorbing the moisture condensed within a heat exchanger that is located in the path of the air to be heated. The moisture so absorbed is continually evaporated by the circulating air, thereby eliminating the necessity of providing a conduit for draining the moisture from the heat exchanger.

While I have described and illustrated but a single embodiment of my invention, it is to be understood by those skilled in the art that many changes, additions, omissions and modifications may be made therein without departing from the spirit and scope of my invention as set forth in the accompanying claims.

I claim as my invention:

1. The combination with a combustion chamber for a furnace having associated therewith a heat exchanger embodying an auxiliary chamber having apertures in the underside thereof, of moisture absorbing material covering the said openings exterior to said auxiliary chamber.

2. The combination with a combustion chamber for a furnace having associated therewith a heat exchanger having apertures in the underside thereof, of means covering the said apertures and adapted to filter the moisture collecting on the innerside of the said exchanger.

3. The combination with a combustion chamber for a furnace having a plurality of radiating tubes associated therewith having openings on their underside, of moisture absorbing material covering the said openings.

4. The combination with a combustion chamber for a furnace having radiating surfaces associated therewith containing apertures, of a passage for air associated with the said radiating surfaces and moisture absorbing means covering the said apertures and positioned within the said air passage.

5. The combination with a combustion chamber for a furnace having radiating tubes associated therewith, of an auxiliary chamber common to the said tubes having apertures in the underside thereof and heat resisting material covering the said openings exterior to said auxiliary chamber adapted to absorb moisture collecting therein.

6. The combination with a combustion chamber for a furnace having radiating tubes associated therewith, of an auxiliary chamber interconnecting the said tubes and provided with apertures in its underside, a passage for air in the vicinity of the chamber and the said tubes and moisture absorbing material covering the said openings and positioned in the said passage.

7. The combination with a combustion chamber for a furnace having radiating tubes associated therewith, of an auxiliary chamber common to the said tubes having apertures in the underside thereof, filtering material covering the said apertures, and means for regulating the rate of filtration of said material.

8. The combination with a combustion chamber for a furnace having radiating tubes associated therewith, of a chamber interconnecting the said tubes and having apertures in the underside thereof, moisture absorbing material sealing the said apertures, and means for regulating the pressure on the said material.

FRANK H. CORNELIUS.